United States Patent
Wu et al.

(10) Patent No.: US 11,204,890 B2
(45) Date of Patent: Dec. 21, 2021

(54) SYSTEM AND METHOD FOR ARCHIVING DATA IN A DECENTRALIZED DATA PROTECTION SYSTEM

(71) Applicant: EMC IP Holding Company LLC, Hopkinton, MA (US)

(72) Inventors: Pengfei Wu, Shanghai (CN); Assaf Natanzon, Tel Aviv (IL); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 455 days.

(21) Appl. No.: 16/234,515

(22) Filed: Dec. 27, 2018

(65) Prior Publication Data

US 2020/0210372 A1 Jul. 2, 2020

(51) Int. Cl.
*G06F 7/00* (2006.01)
*G06F 16/11* (2019.01)
*G06F 16/16* (2019.01)

(52) U.S. Cl.
CPC .......... *G06F 16/113* (2019.01); *G06F 16/162* (2019.01)

(58) Field of Classification Search
CPC ...... G06F 16/113; G06F 16/162; G06F 16/27; G06F 16/1748; G06F 11/1469; G06F 11/1453; G06F 11/1451; G06F 11/1448; G06F 11/1435; G06F 21/6227
See application file for complete search history.

(56) References Cited

U.S. PATENT DOCUMENTS

| | | | |
|---|---|---|---|
| 7,475,199 B1 | 1/2009 | Bobbitt et al. | |
| 9,639,539 B1 | 5/2017 | Devta et al. | |
| 2003/0115218 A1 | 6/2003 | Bobbitt et al. | |
| 2016/0314046 A1* | 10/2016 | Kumarasamy | G06F 11/1451 |
| 2020/0073763 A1* | 3/2020 | Saini | G06F 16/2365 |

OTHER PUBLICATIONS

Extended European Search Report issued in corresponding European Application No. 19218607.0, dated May 8, 2020.
Nils Haustein; "IBM Spectrum Archive Solutions"; IBM Corporation; Version 4.0; Jun. 21, 2016 (https://www.ibm.com/developerworks/community/files/basic/anonymous/api/library/cba8122c-7c84-47b8-8be2-571250a664f8/document/c4cc714b-f15d-4723-8873-f8a9e5368760/media/Spectrum%20Archive%20Solutions.pdf).

* cited by examiner

*Primary Examiner* — Azam M Cheema
(74) *Attorney, Agent, or Firm* — Chamberlain, Hrdlicka, White, Williams & Aughtry

(57) ABSTRACT

A node for use in a data archive includes a persistent storage and a data protection agent. The persistent storage stores a copy of data. The data protection agent obtains a request to archive the copy of the data; in response to the request: generates an archive of the copy of the data; stores the archive in an archive node; generates metadata based on the archive; deletes the copy of the data from the persistent storage; and, after deleting the copy of the data, advertises, to a second node, that the copy of the data is stored in the node.

20 Claims, 17 Drawing Sheets

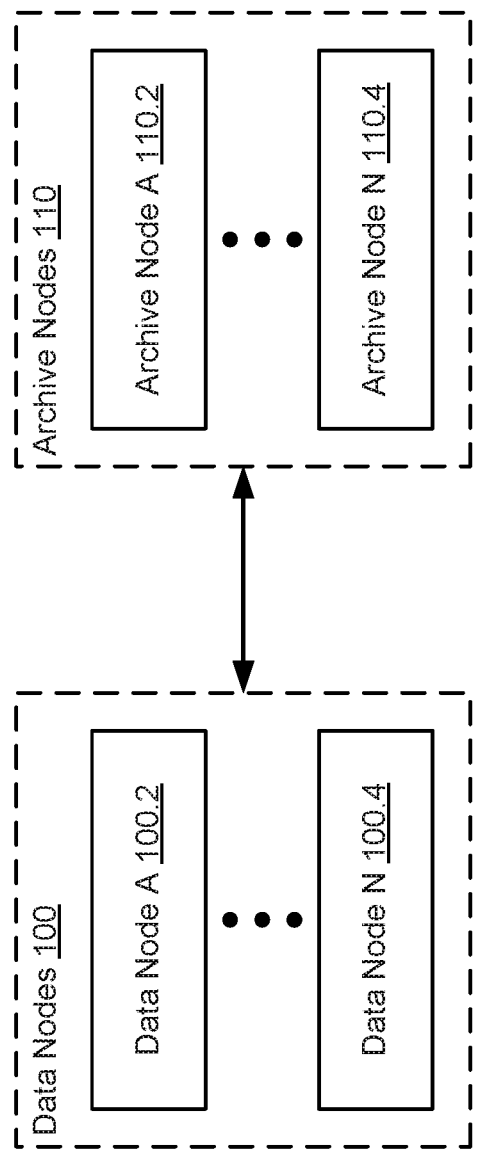

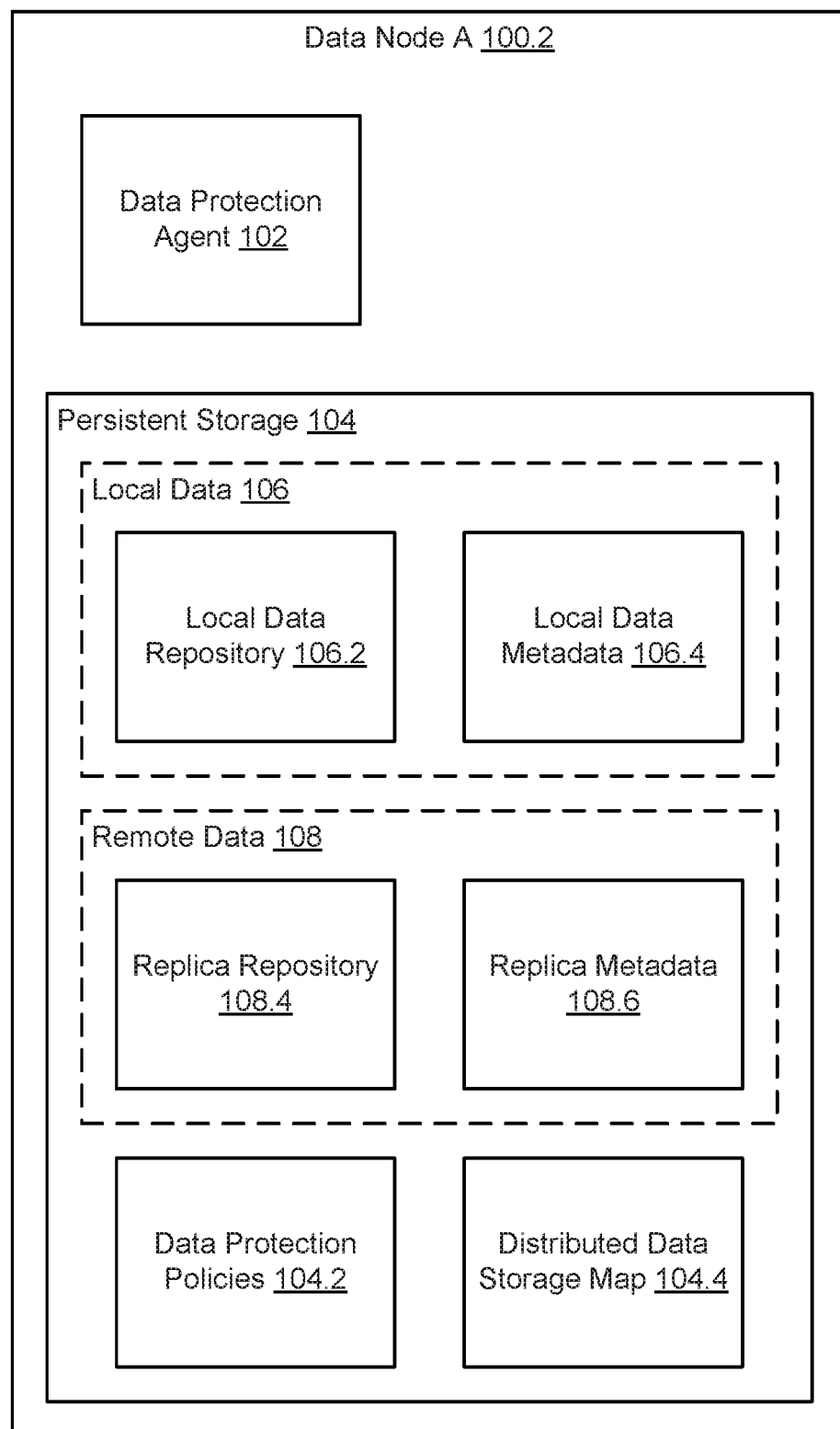
FIG. 1.2

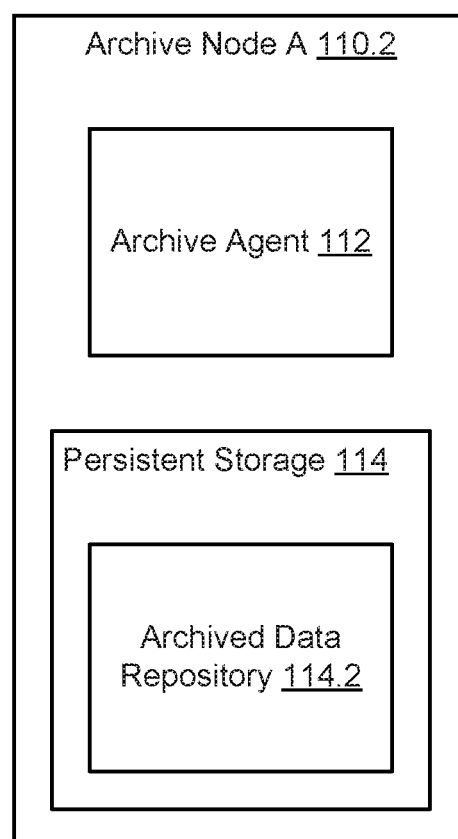
FIG. 1.3

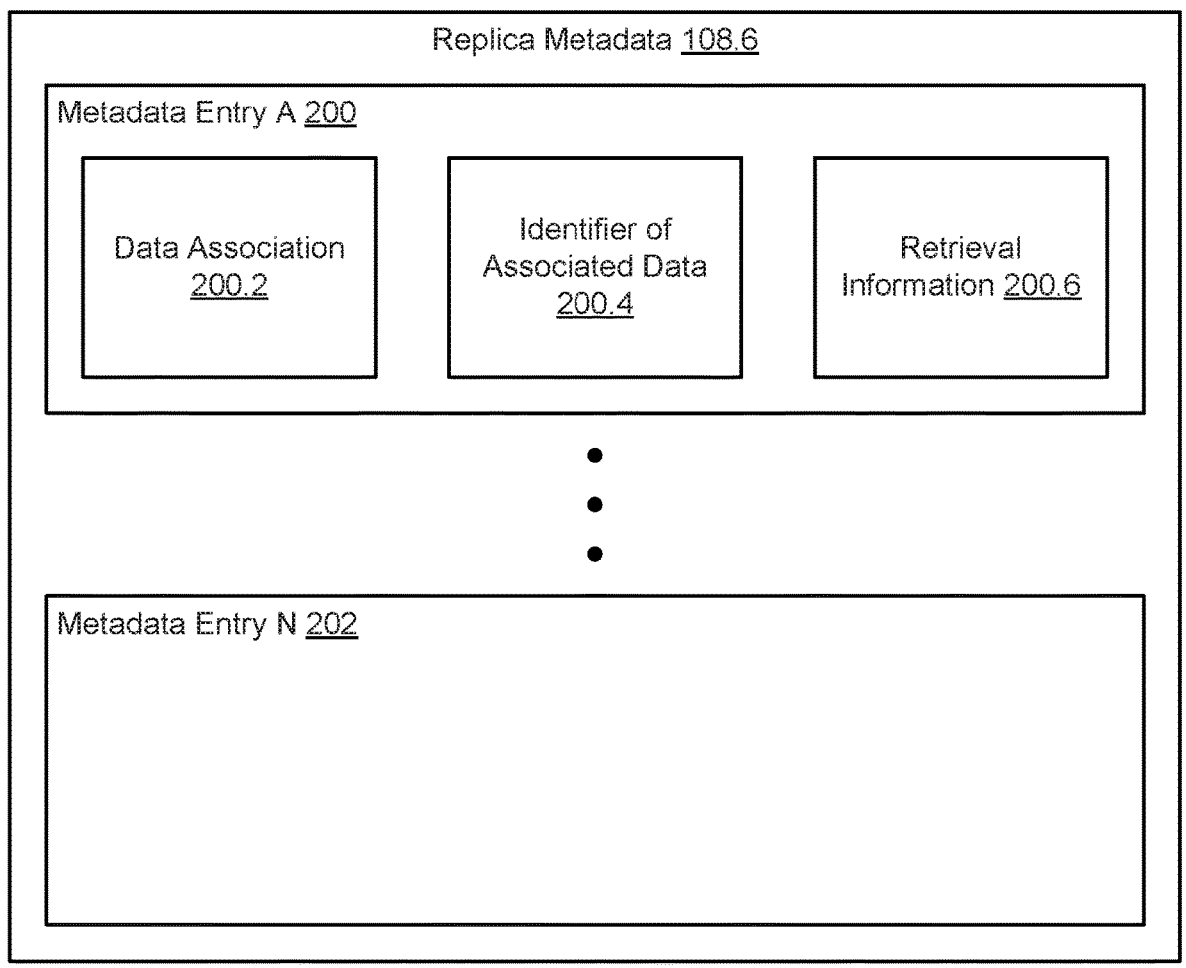
FIG. 2.1

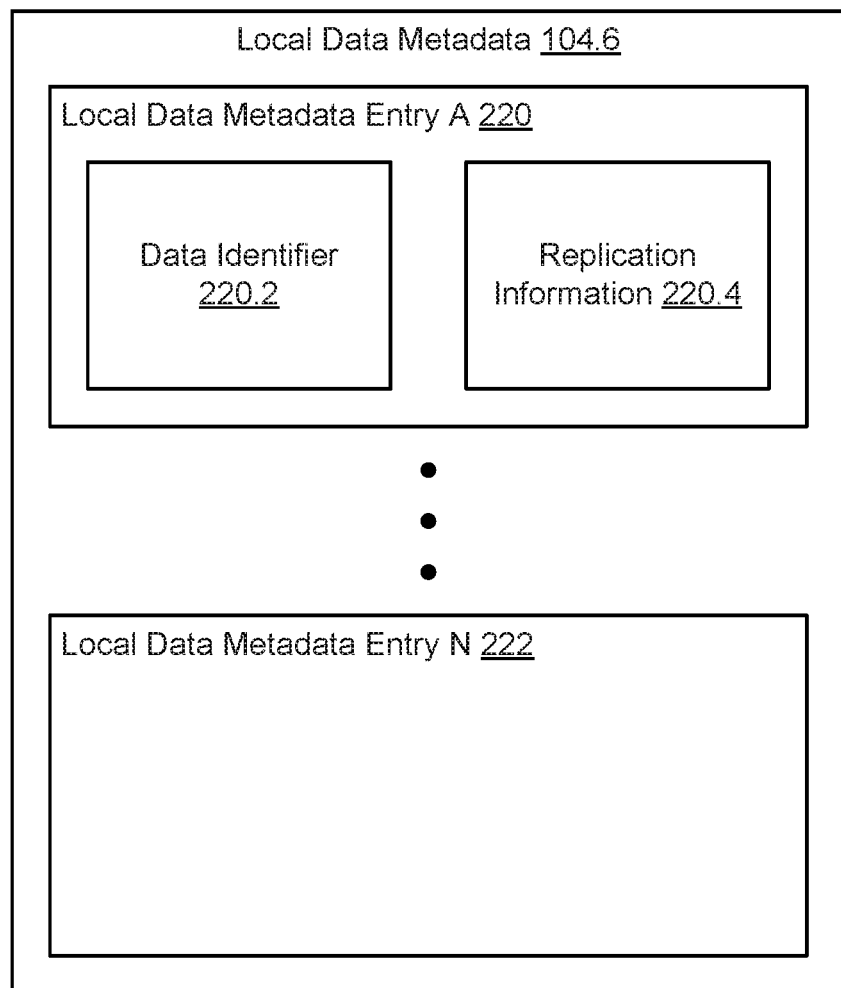
FIG. 2.2

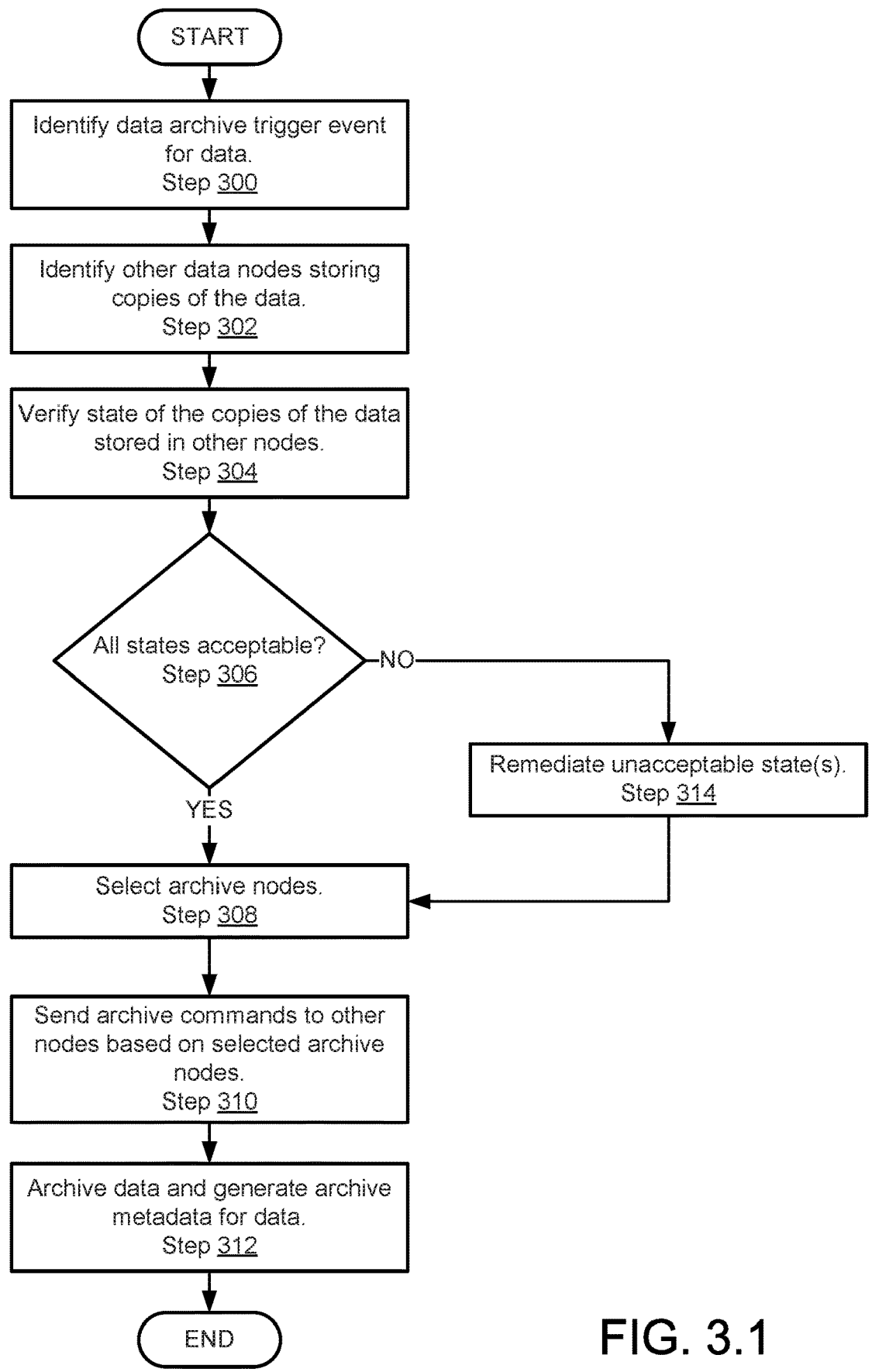
FIG. 3.1

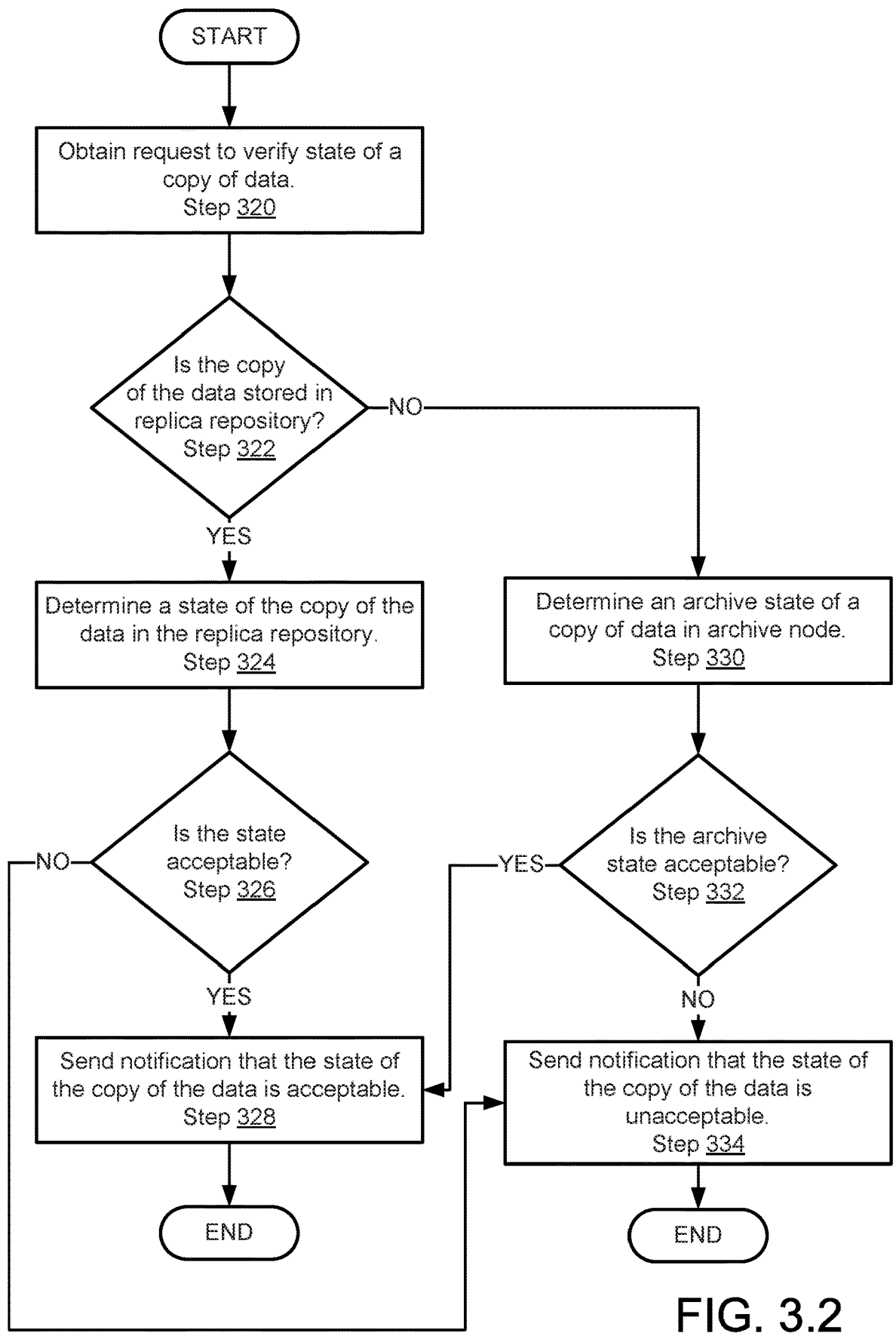
FIG. 3.2

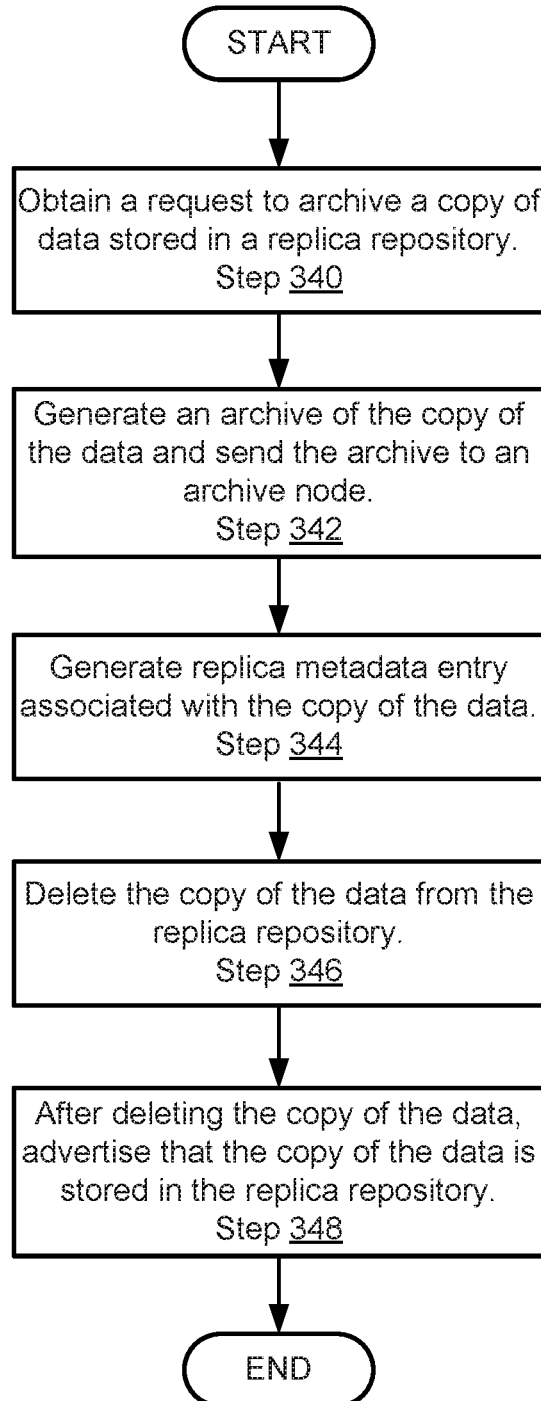
FIG. 3.3

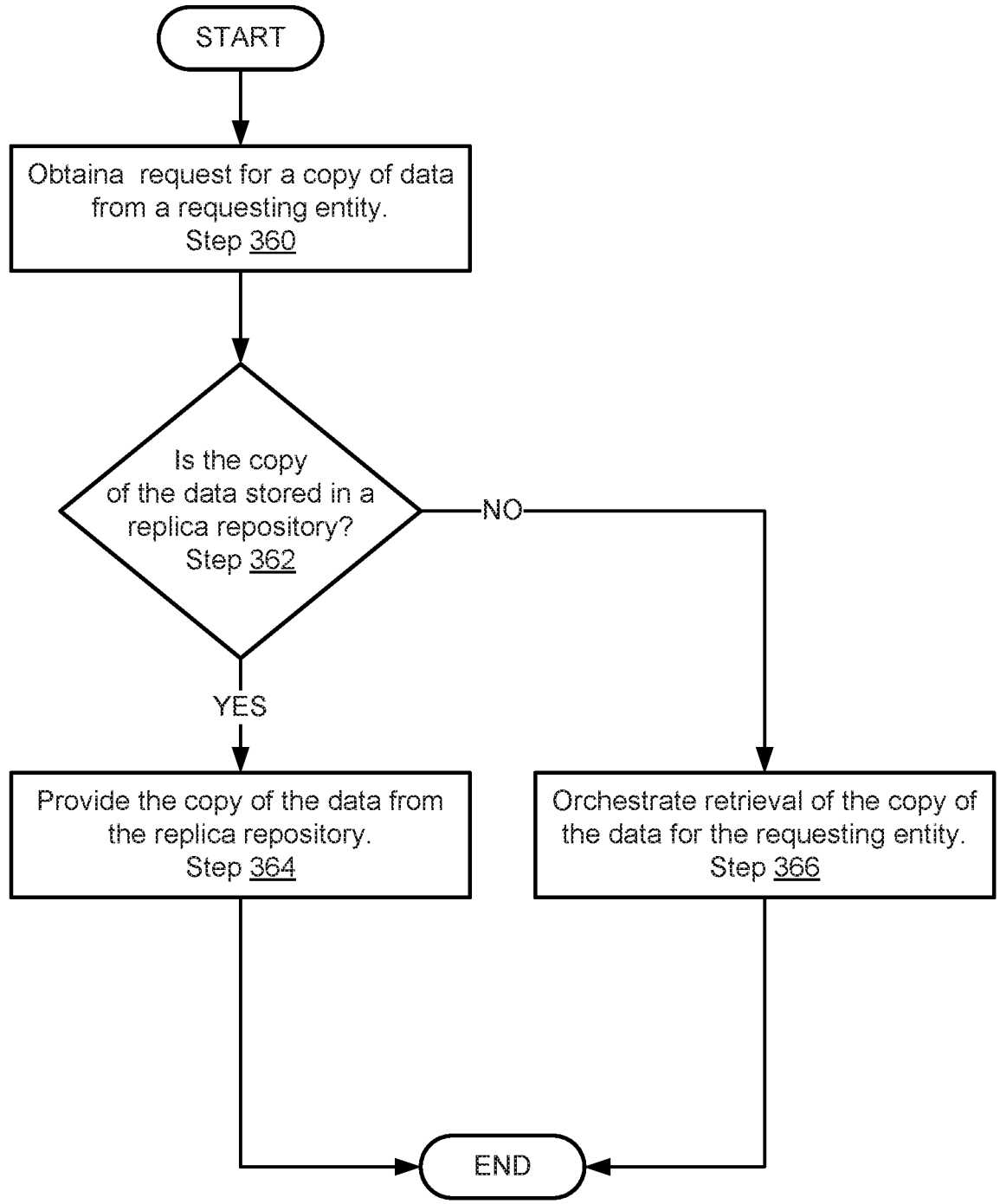
FIG. 3.4

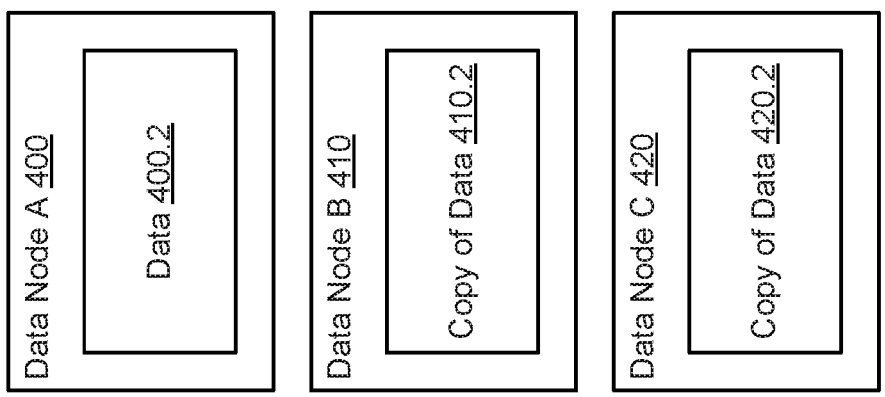
FIG. 4.1

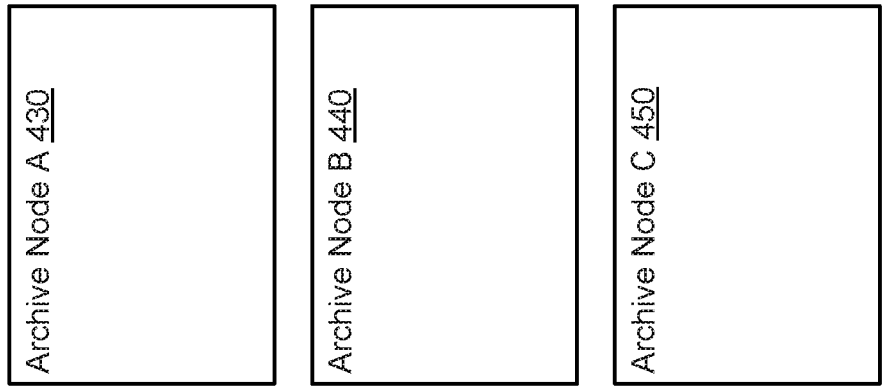
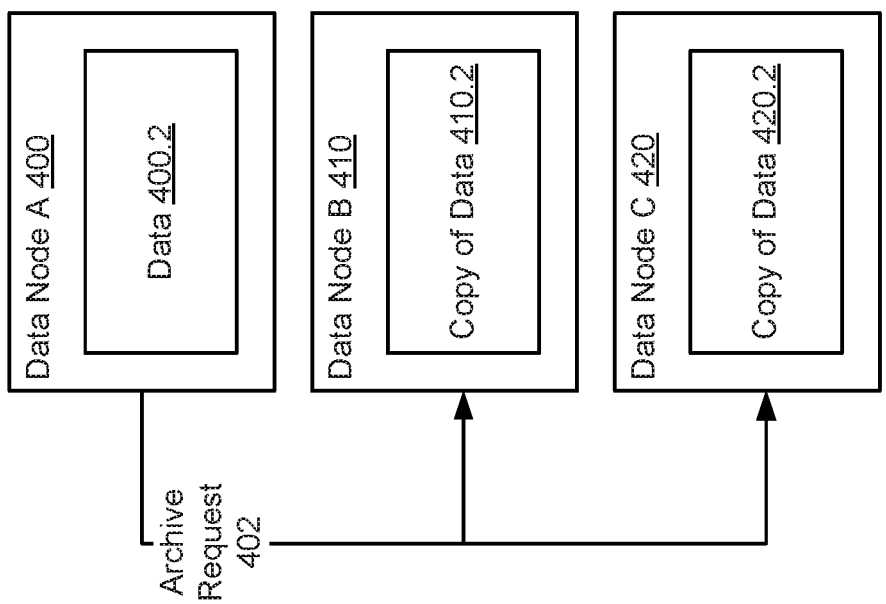
FIG. 4.2

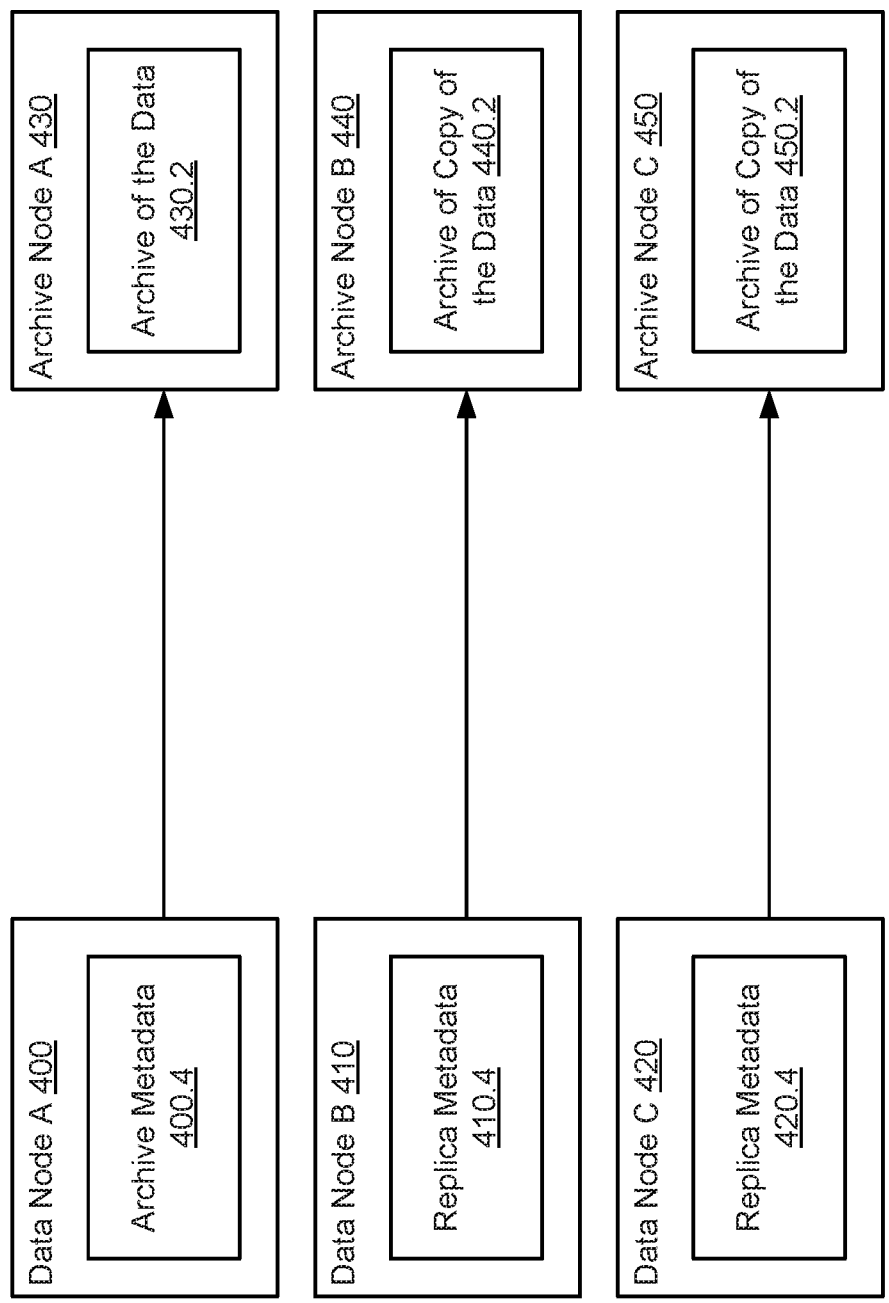
FIG. 4.3

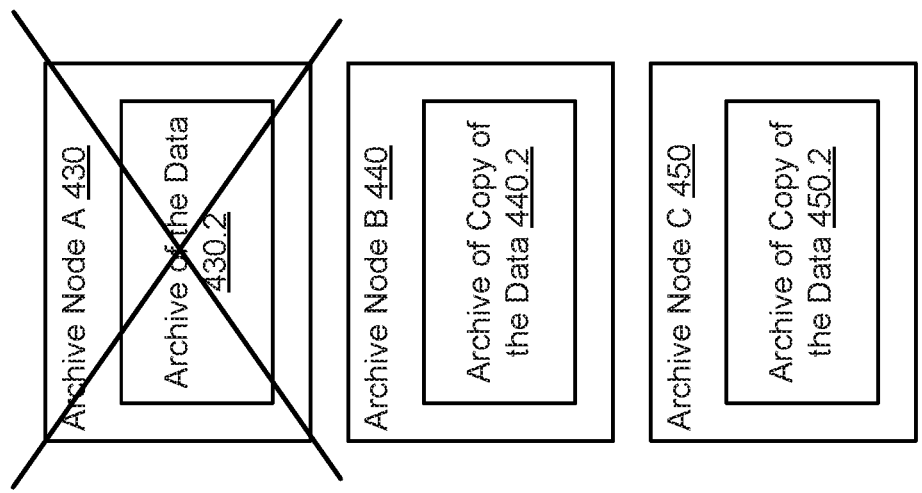
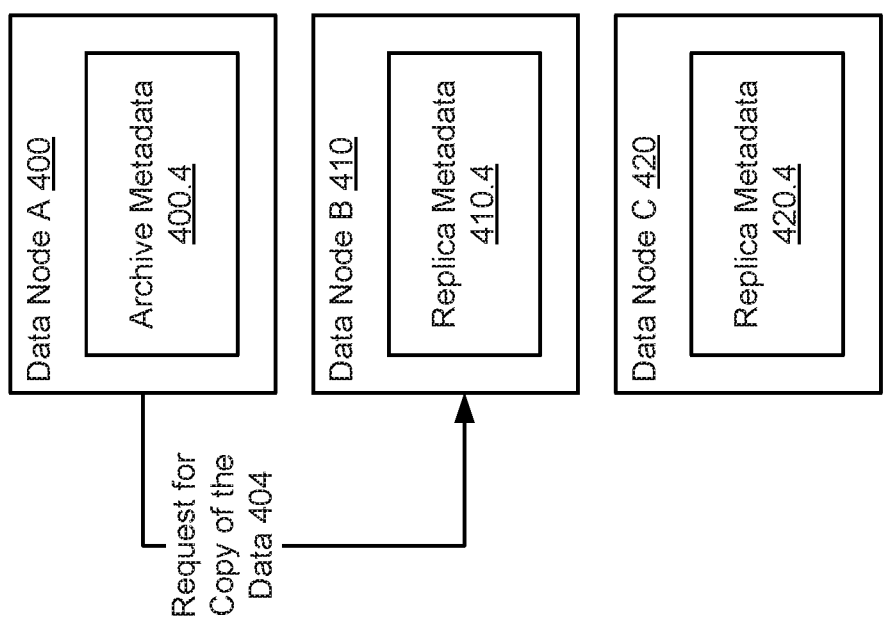
FIG. 4.4

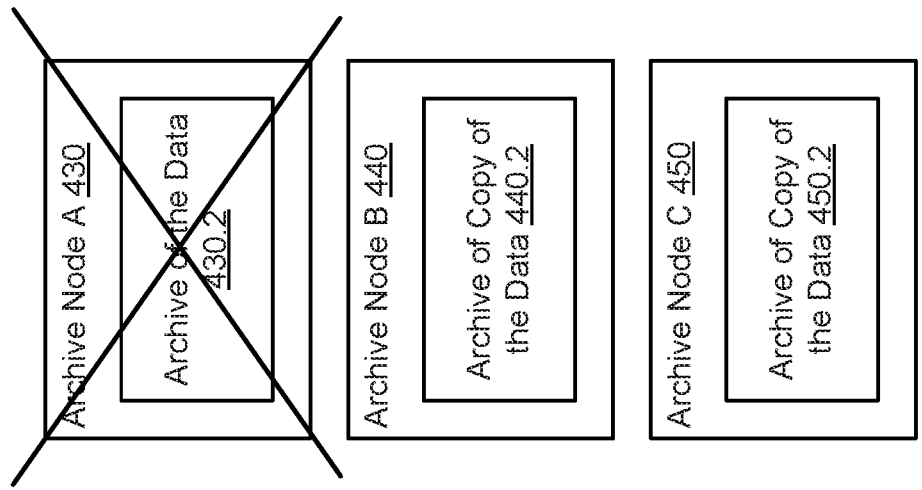
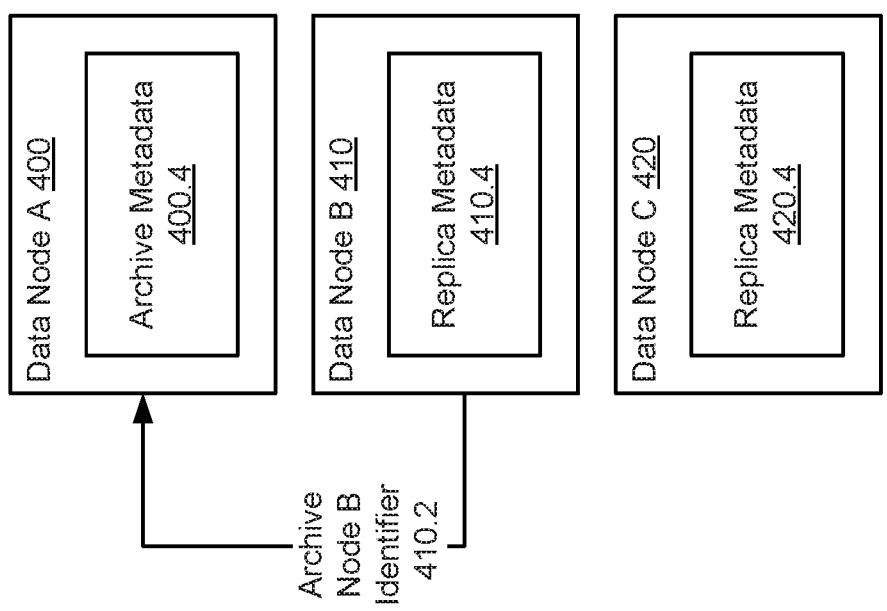
FIG. 4.5

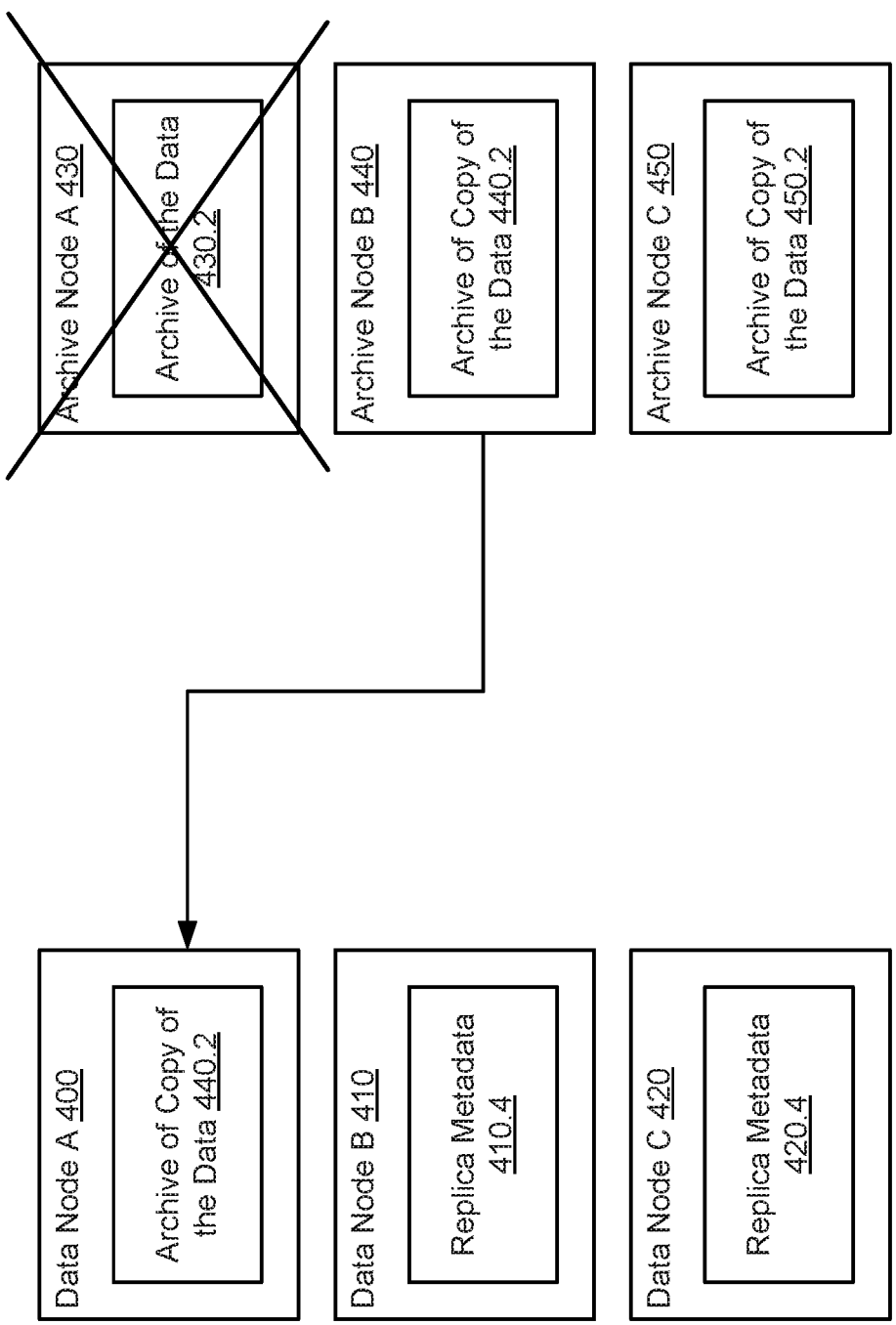
FIG. 4.6

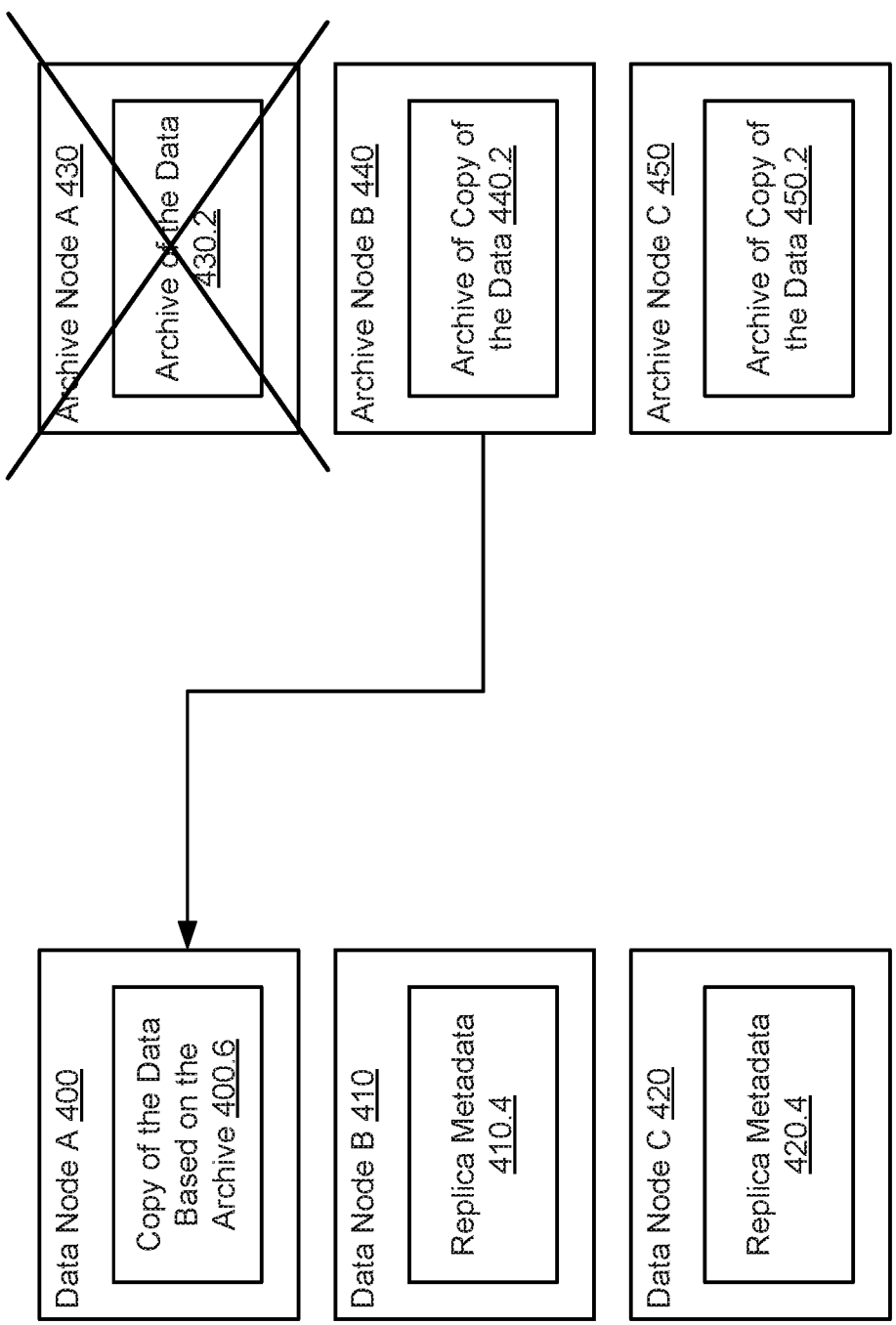
FIG. 4.7

SYSTEM AND METHOD FOR ARCHIVING DATA IN A DECENTRALIZED DATA PROTECTION SYSTEM

BACKGROUND

Computing devices may store information. The information may reflect information entered by a user. Such information may be important to a user. For example, a user may type information into a database, may add data to a spreadsheet, or may draft emails. Each of these interactions between a user and a computing device may cause information important to a user to be stored in a computing device.

In a distributed computing environment, multiple computing devices may be operably connected to each other. To provide redundancy, copies of data may be stored in multiple computing devices to prevent failure of one of the computing devices from causing data loss.

SUMMARY

In one aspect, a node for use in a data archive in accordance with one or more embodiments of the invention includes a persistent storage and a data protection agent. The persistent storage stores a copy of data. The data protection agent obtains a request to archive the copy of the data; in response to the request: generates an archive of the copy of the data; stores the archive in an archive node; generates metadata based on the archive; deletes the copy of the data from the persistent storage; and, after deleting the copy of the data, advertises, to a second node, that the copy of the data is stored in the node.

In one aspect, a method for managing a node in a data archive in accordance with one or more embodiments of the invention includes obtaining a request to archive a copy of data stored in the node; in response to the request: generating an archive of the copy of the data; storing the archive in an archive node; generating metadata based on the archive; deleting the copy of the data from persistent storage of the node; and, after deleting the copy of the data, advertising, to a second node, that the copy of the data is stored in the node.

In one aspect, a non-transitory computer readable medium in accordance with one or more embodiments of the invention includes computer readable program code, which when executed by a computer processor enables the computer processor to perform a method for managing a node in a data archive. The method includes obtaining a request to archive a copy of data stored in the node; in response to the request: generating an archive of the copy of the data; storing the archive in an archive node; generating metadata based on the archive; deleting the copy of the data from persistent storage of the node; and, after deleting the copy of the data, advertising, to a second node, that the copy of the data is stored in the node.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a data node in accordance with one or more embodiments of the invention.

FIG. 1.3 shows a diagram of an archive node in accordance with one or more embodiments of the invention.

FIG. 2.1 shows a diagram of replica metadata in accordance with one or more embodiments of the invention.

FIG. 2.2 shows a diagram of local data metadata in accordance with one or more embodiments of the invention.

FIG. 3.1 shows a flowchart of a method of archiving data in accordance with one or more embodiments of the invention.

FIG. 3.2 shows a flowchart of a method of responding to a data state verification request in accordance with one or more embodiments of the invention.

FIG. 3.3 shows a flowchart of a method of responding to a data archive request in accordance with one or more embodiments of the invention.

FIG. 3.4 shows a flowchart of a method of responding to a request for a copy of data in accordance with one or more embodiments of the invention.

FIGS. 4.1-4.7 show diagrams of an example system at different points in time.

DETAILED DESCRIPTION

Figure 5:
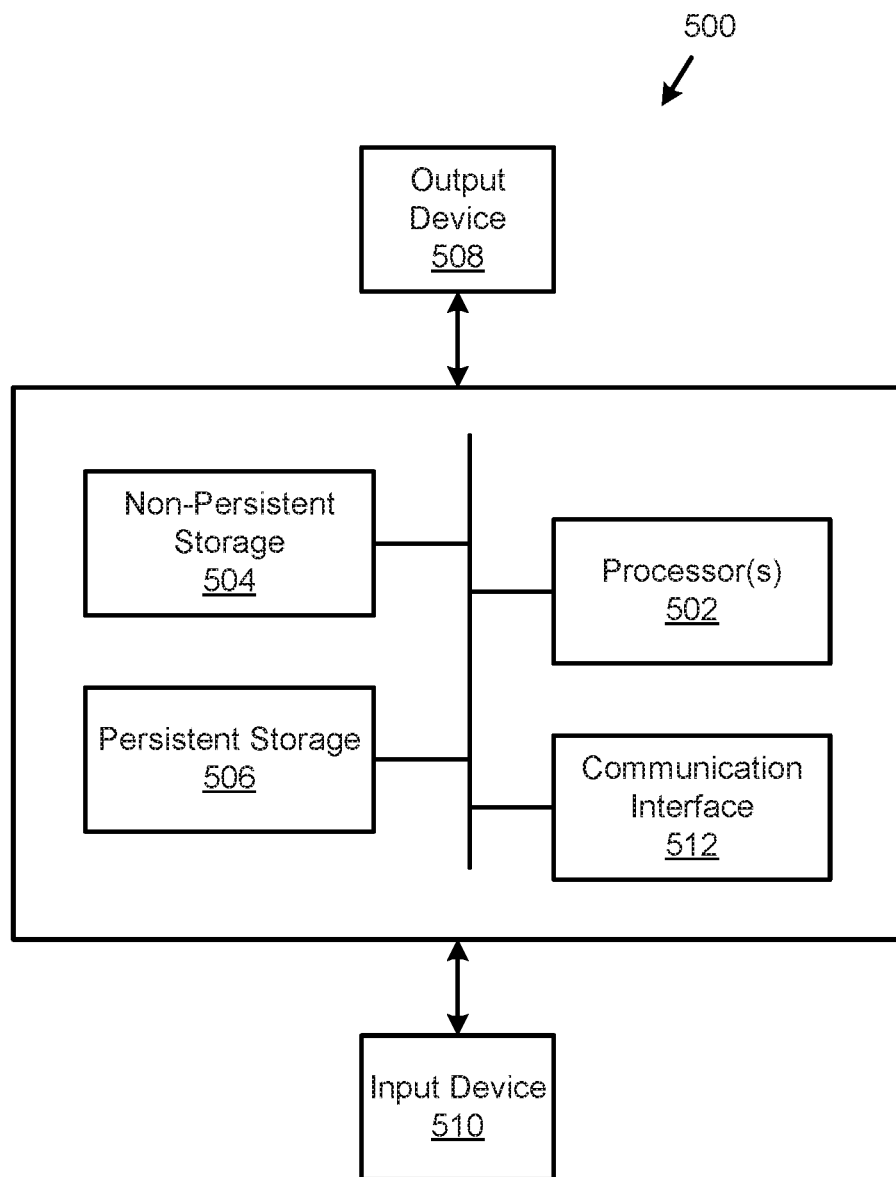
FIG. 5 shows a diagram of a computing device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing data protection in a decentralized data storage system. A system in accordance with embodiments of the invention may include data nodes and archive nodes. The data nodes may redundantly store multiple copies of data for data integrity purposes.

In one or more embodiments of the invention, the data nodes archive data in the archive nodes. When the data node archives a copy of data in the archive nodes, the data node may continue to advertise that it still stores a copy of the data even after it has deleted the copy of the data. Prior to deleting the copy of the data, the data node may generate archive metadata associated with the archive of the data that enables the data node to ensure that any entity that requests a copy of the data is able to retrieve a copy of the data. By doing so, embodiments of the invention may provide a decentralized data protection system that is tolerant the changes in network connectivity between the nodes of the system. In contrast, contemporary decentralized data storage may be susceptible to data loss or may be otherwise inefficient at storing data when the connectivity between nodes of the decentralized data storage system changes and/or is subject to changes.

FIG. 1 shows an example system in accordance with one or more embodiments of the invention. The system may be a decentralized data protection system. The system may include data nodes (100) that generate data and archive nodes (110) that store archived data that was generated by the data nodes (100) and/or other entities. To provide for a decentralized data protection system, the data nodes (100) may support an architecture that stores multiple copies of data generated by any of the data nodes (100) in multiple data nodes (100). For example, the data nodes (100) may each follow a policy that requires three copies of data (or other numbers of copies) to be stored within the data nodes (100) at all points in time. By doing so, the decentralized data protection system may improve reliability of storing data when compared to only storing a single copy of data in the data nodes (100).

Each component of the system of FIG. 1 may be operably connected via any combination of wired and wireless connections. However, the operable connections between each of the components may not be always available. For example, due to the network topology between each of the data nodes (e.g., 100.2, 100.4) and each of the archive nodes (e.g., 110.2, 110.4), each node may not always be connected to each of the other nodes at all times.

For example, consider a scenario in which each the data nodes (100) are computing devices of automobiles and each of the archive nodes (110) are cloud resources connected to the Internet. Because of the wireless connections that operably interconnect the data nodes (100), any of the data nodes (100) may become temporarily unreachable with respect to any of the other data nodes (100) and/or any of the archive nodes (110).

Due to the changing topology of the nodes of the decentralized data protection system, embodiments of the invention may provide methodologies for verifying that a sufficient number of copies of data stored within the data nodes (100) to meet data protection policies of the decentralized data protection system, archiving data stored in the data nodes (100), and retrieving data stored in the data protection system. To further explain aspects of embodiments of the invention, each component of the system of FIG. 1.1 is discussed below.

The data nodes (100) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the data nodes (100) described in this application and/or all or a portion of the methods illustrated in FIGS. 3.1-3.4. The data nodes (100) may be other types of computing devices without departing from the invention. For additional details regarding computing devices, refer to FIG. 5.

In one or more embodiments of the invention, the data nodes (100) are distributed computing devices. A distributed computing device may refer to functionality provided by a logical device that utilizes the computing resources of one or more separate and/or distinct computing devices. For example, in one or more embodiments of the invention, the data nodes (100) may be distributed devices that include components distributed across any number of separate and/or distinct computing devices. In such a scenario, the functionality of the data nodes (100) may be performed by multiple different physical computing devices without departing from the invention.

The data nodes (100) may implement data protection strategies for the decentralized data protection system. The data protection strategies may include storing a predetermined number of copies of data in data nodes, archiving copies of the data when predetermined conditions are met in the archive nodes (110), locally storing metadata regarding the archive copies of the data in the data node that stored each respective archived copy of the data, deleting the copy of the data from the data node after the data node stored the archived copy of the data in the archive nodes (110), and continuing to advertise to the other data nodes that the data node that deleted the copy of the data still has the copy of the data. By doing so, the decentralized data protection system may provide data redundancy and data archiving services even when nodes of the decentralized data protection system become unreachable due to changes in network topology. In environments where connectivity between the data nodes (110) and other entities is subject to change, the aforementioned data protection strategies performed by the data nodes (110) may improve the reliability of storing data in a distributed system and improve the efficiency of retrieving copies of the data even when archived. For additional details regarding the data nodes (100), refer to FIG. 1.2.

The archive nodes (110) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the archive nodes (110) described in this application and/or all or a portion of the methods illustrated in FIGS. 3.1-3.4. The archive nodes (110) may be other types of computing devices without departing from the invention. For additional details regarding computing devices, refer to FIG. 5.

In one or more embodiments of the invention, the archive nodes (110) are distributed computing devices. A distributed computing device may refer to functionality provided by a logical device that utilizes the computing resources of one or more separate and/or distinct computing devices. For example, in one or more embodiments of the invention, the archive nodes (110) may be distributed devices that include components distributed across any number of separate and/or distinct computing devices. In such a scenario, the functionality of the archive nodes (110) may be performed by multiple different physical computing devices without departing from the invention.

The archive nodes (110) may provide data archive services for the data nodes (100). For example, the archive nodes (110) may store archives of data and provide copies of stored archives of data. For additional details regarding the archive nodes (110), refer to FIG. 1.3.

As discussed above, the data nodes (100) may implement data protection policies of a decentralized data protection system. FIG. 1.2 shows a diagram of data node A (100.2) in accordance with one or more embodiments of the invention. The other data nodes of FIG. 1.1 may be similar to data node A (100.2).

As noted above, data node A (100.2) may implement data protection policies of the decentralized data protection system of FIG. 1.1. To implement the data protection policies, the data node A (100.2) may include a data protection agent (102) and a persistent storage (104). Each component of data node A (100.2) is discussed below.

In one or more embodiments of the invention, the data protection agent (102) manages data stored in the persistent storage (104). To manage data stored in the persistent storage (104), the data protection agent (102) may: (i) store copies of data in other data nodes, (ii) archive the stored copies of the data in response to predetermined conditions, (iii) generate metadata regarding archived copies of the data that enables the archived copies of the data to be retrieved, (iv) delete the copies of the data after archiving, and (v) continue to advertise that the copies of the data are available after the copies of the data are deleted. To provide the aforementioned functionality of the data protection agent (102), the data protection agent may perform all or portion of the methods illustrated in Ms. 3.1-3.4.

In one or more embodiments of the invention, the data protection agent (102) is a hardware device including circuitry. The data protection agent (102)) may be, for example, a digital signal processor, a field programmable gate array, or an application specific integrated circuit. The data protection agent (102) may be other types of hardware devices without departing from the invention.

In one or more embodiments of the invention, the data protection agent (102) is implemented as computing code stored on a persistent storage that when executed by a processor performs the functionality of the data protection agent (102). The processor may be a hardware processor including circuitry such as, for example, a central processing unit or a microcontroller. The processor may be other types of hardware devices for processing digital information without departing from the invention.

In one or more embodiments of the invention, the persistent storage (104) is a storage device that stores data structures. The persistent storage (104) may be a physical or logical device. For example, the persistent storage (104) may include solid state drives, solid state drives, tape drives, and other components to provide data storage functionality. Alternatively, the persistent storage (104) may be a logical device that utilizes the physical computing resources of other components to provide data storage functionality.

In one or more embodiments of the invention, the persistent storage (104) stores local data (106), remote data (108), data protection policies (104.2), and a distributed data storage map (104.4). Each of these data structures is discussed below.

The local data (106) may be a data structure including information relating to data generated by the data node A (100.2). For example, the local data (106) may include a local data repository (106.2) that includes data generated by the data node A (100.2). The local data repository (106.2) include any amount of data generated by the data node A (100.2). The local data (106) may also include local metadata (106.4). The local metadata (106.4) may include information relating to data stored in the local data repository (106.2).

As will be discussed in greater detail below, the data protection agent (102) may store copies of data stored in the local data repository (106.2) and other data nodes to meet requirements of the data protection policies (106.2). The local metadata (106.4) may include information indicating where the copies of the data are stored. For example, information an identifier of each other data node that stores a copy of data from the local data repository (106.2) may be included in the local data metadata (106.4). By doing so, data node A (100.2) may be able to determine the locations of copies of data of the local data repository (106.2). For additional details regarding local metadata, refer to FIG. 2.2.

The remote data (108) may be a data structure including information relating to copies of data obtained from other data nodes. For example, the remote data (108) may include a replica repository (108.4) that includes copies of data from other data nodes. Such copies may provide data redundancy in the decentralized data protection system. The remote data (108) may also include replica metadata (108.6).

As will be discussed in greater detail below, the data protection agent (102) may archive copies of data stored in the replica repository (108.4) and may delete the copies of the data stored in the replica repository (108.4) after storing the archive copies in archive nodes. The replica metadata (108.6) may include information that enables the data protection agent (102) to ensure that other nodes may be able to obtain copies of data that have been archived by the data protection agent (102). For additional details regarding replica metadata (108.6), refer to FIG. 2.1.

The data protection policies (104.2) may be a data structure including information regarding requirements of the decentralized data protection system. For example, the data protection policies (104.2) may specify: (i) the number of copies of data that must be stored in different data nodes, (ii) when data and copies of data should be archived, and/or (iii) actions that should be taken when nodes are unable to verify that the number of copies of the data are stored in different data nodes meet the required number of copies to be stored in different data nodes. The data protection policies (104.2) may specify additional, different, and/or fewer requirements of the decentralized data protection system without departing from the invention.

The distributed data storage map (104.4) may be a data structure that specifies where data and/or copies of data are stored in the decentralized data protection system. Each of the nodes of the decentralized data protection system may continuously advertise the data stored in each respective node to ensure that the distributed data storage map (104.4) maintained by each node is up-to-date. The distributed data storage map (104.4) include information that enables the data protection agent (102) to ascertain the locations where data and/or copies of data are stored.

In one or more embodiments of the invention, the distributed data storage map (104.4) is implemented as a distributed hash table. For example, the distributed data storage map (104.4) may map hashes of data to location information for the data. Thus, the location of data may be obtained using a hash of the data. The distributed data storage map (104.4) may be implemented using different types of data structures without departing from the invention.

While the persistent storage (104) illustrated in FIG. 1.2 is shown as including a limited number of data structures, the persistent storage (104) may include additional, fewer, and/or different data structures without departing from the invention. Further, while the data structures are illustrated as being separate, the data included in the data structures stored in the persistent storage (104) may be stored as a single data structure, may include additional information than that discussed above, and may be stored in different locations without departing from the invention.

As noted above, data nodes may store archives of data in archive nodes. FIG. 1.3 shows a diagram of archive node A (110.2) in accordance with one or more embodiments of the invention. The other archive nodes of FIG. 1.1 may be similar to archive node A (110.2).

As noted above, archive node A (110.2) may provide data archival services to data nodes. To provide this functionality, the archive node A (110.2) may include an archive agent (112) and a persistent storage (114). Each component of archive node A (110.2) is discussed below.

In one or more embodiments of the invention, the archive agent (112) provides archive services to data nodes. For example, the archive agent (112) may obtain data from data nodes and store the data in the persistent storage (114). The archive agent (112) may also provide stored copies of data from the persistent storage (114) in response to requests from data nodes and/or other entities.

In one or more embodiments of the invention, the archive agent (112) is a hardware device including circuitry. The archive agent (112) may be, for example, a digital signal processor, a field programmable gate array, or an application specific integrated circuit. The archive agent (112) may be other types of hardware devices without departing from the invention.

In one or more embodiments of the invention, the archive agent (112) is implemented as computing code stored on a persistent storage that when executed by a processor performs the functionality of the archive agent (112). The processor may be a hardware processor including circuitry such as, for example, a central processing unit or a microcontroller. The processor may be other types of hardware devices for processing digital information without departing from the invention.

In one or more embodiments of the invention, the persistent storage (114) is a storage device that stores data structures. The persistent storage (114) may be a physical or logical device. For example, the persistent storage (114) may include solid state drives, solid state drives, tape drives, and other components to provide data storage functionality. Alternatively, the persistent storage (114) may be a logical device that utilizes the physical computing resources of other components to provide data storage functionality.

In one or more embodiments of the invention, the persistent storage (114) stores an archived data repository (114.2). The archived data repository (114.2) may store data from data nodes. For example, the data nodes may send archives of data to the archive agent (112) and the archive agent (112) may store archives of the data in the archived data repository (114.2).

While the persistent storage (114) illustrated in FIG. 1.3 is shown as including a limited number of data structures, the persistent storage (114) may include additional, fewer, and/or different data structures without departing from the invention. Further, while the data structures are illustrated as being separate, the data included in the data structures stored in the persistent storage (114) may be stored as a single data structure, may include additional information than that discussed above, and may be stored in different locations without departing from the invention.

To further clarify aspects of embodiments of the invention, diagrams of data structures utilized by nodes of the decentralized data protection system of FIG. 1.1 are illustrated in FIGS. 2.1-2.2.

FIG. 2.1 shows a diagram of replica metadata (108.6) in accordance with one or more embodiments of the invention. As noted above, replica metadata (108.6) may enable a data node to orchestrate retrieval of a copy of data by another data node. Replica metadata (108.6) may include any number of entries (e.g., 200, 202). Each of entries may be associated with an archive of a copy data stored in an archive node. The copy of the data may have been deleted from a replica repository.

Metadata entry A (200) includes information that may be used to obtain a copy of data from which an archive was generated. Metadata entry A (200) may include a data association (200.2) that associates metadata entry A (200) with an archive in an archive node. For example, the data association (200.2) may be an identifier of the archive.

Metadata entry A (200) may also include an identifier of associated data (200.4). The identifier of the associated data (200.4) may be an identifier of the copy of the data from which the archive associated with the metadata entry A (200) was generated.

Metadata entry A (200) may also include retrieval information (200.6). The retrieval information (200.6) may be information that enables the archive associated with metadata entry A (200) to be obtained. For example, the retrieval information (200.6) may be an identifier of an archive node storing the archive.

Each entry of the replica metadata (108.6) may include information similar to metadata entry A (200) but for other archives of data. Thus, the replica metadata (108.6) may include an entry for each archive that the data node and stored in archive nodes.

FIG. 2.2 shows a diagram of local data metadata (104.6) in accordance with one or more embodiments of the invention. As noted above, local data metadata (104.6) may track where copies of data are stored across the decentralized data protection system. The local data metadata (104.6) may include any number of entries (e.g., 220, 222). Each of the entries may be associated with data stored in a local data repository.

Local metadata entry A (220) includes information that may be used to track where copies of data associated with the local metadata entry A (220) are stored. Local metadata entry A (220) may include a data identifier (220.2) that identifies the data associated with the entry. For example, the data identifier (220.2) may be an identifier of the data within a local data repository such as a file name or uniform resource identifier.

Local metadata entry A (220) may also include replication information (220.4). The replication information (220.4) may specify where copies of the data are stored. For example, the replication information (220.4) may include identifiers of other data nodes that store copies of the data associated with the local data meta data entry A (220).

Each entry of the local data metadata (104.6) may include information similar to local data metadata entry A (220) but for other archives of data. Thus, the local data metadata (104.6) may include an entry for each portion of data stored in a local data repository.

As discussed above, components of the system of FIG. 1.1 may perform methods for managing a decentralized data protection system. FIGS. 3.1-3.4 show methods in accordance with one or more embodiments of the invention that may be performed by components of the system of FIG. 1.1. Any of the steps show in FIGS. 3.1-3.4 may be omitted, performed in a different order, and/or performed in parallel or partially overlapping manner with respect to other steps without departing from the invention.

FIG. 3.1 shows a flowchart of a method in accordance with one or more embodiments of the invention. The method depicted in FIG. 3.1 may be used to archive data in accordance with one or more embodiments of the invention. The method shown in FIG. 3.1 may be performed by, for example, data nodes (e.g., 100, FIG. 1.1), Other components of the system illustrated in FIG. 1.1 may perform the method of FIG. 3.1 without departing from the invention.

In step 300, a data archive trigger event for data is identified.

In one or more embodiments of the invention, the data archive trigger event is an event specified by data protection policies. For example, the data archive trigger event may be related to the age of data. The data protection policies may specify that all data having an age greater than six months is to be archived. The data protection policies may specify any type and quantity of policies that specify data archive trigger events.

In one or more embodiments of the invention, the data archive trigger event is identified by monitoring of local data by the data node. That is, the data node may monitor an age of the local data and may identify the data archive trigger event when the age of the data exceeds an age specified by the data protection policies. The data archive trigger event may be identified via other methods without departing from the invention. For example, the data archive trigger event may be instruction sent to the data node by another entity.

In step 302, other data nodes storing copies of the data are identified.

In one or more embodiments of the invention, the other data nodes are identified using local data metadata. As noted above, when copies of data are replicated to other data nodes such information may be recorded in local metadata associated with the data.

In step 304, the state of the copies of the data stored in the other nodes is verified.

In one or more embodiments of the invention, the state of the copies of the data stored in the other nodes is verified by sending requests state information to the other data nodes. Responses from the other data nodes may include the state information of the copies of the data.

In step 306, is determined whether all states of the copies of the data are acceptable. That is, it is determined whether all of the other data nodes storing copies of the data both (i) reply to the requests sent by the data node and (ii) indicate that a copy of the data is stored on the other data nodes.

If all states of the copies of the data are acceptable, the method may proceed to step 308. If all of the states of the copies of the data are not acceptable, the method may proceed to step 314.

In step 308, archive nodes are selected.

In one or more embodiments of the invention, the archive nodes are selected based on the connectivity between the data node and the archive nodes. For example, the data node may select archive nodes that are highly available to the data node. As will be discussed in greater detail below, in some scenarios the data node may retrieve archive copies of the data from the archive nodes rather than other data nodes.

In step 310, archive commands are sent to the other data nodes based on the selected archive nodes. For example, the data node may send instructions to the other data nodes indicating that the copies of the data are to be archived and stored in the archive nodes.

In step 312, the data is archived and archive metadata for the data is generated.

In one or more embodiments of the invention, the data is archived by generating and archive of the data, sending the generated archive to an archive node, and deleting the data. The archive metadata include information reflecting where the archive of the data is stored. That is, identification information or other information that allows the data node to identify the archive node storing the archive of the data.

The method may end following step 312.

Returning to step 306, the method may proceed to step 314 following step 306.

In step 306, the unacceptable state(s) is/are remediated.

In one or more embodiments of the invention, remediating an unacceptable state is accomplished by storing an additional copy of the data in an additional data node. For example, when a data node that was storing a copy of the data is unreachable to changes in network topology, the data node may store an additional copy in an additional data node that is reachable. By doing so, an additional copy of the data may be redundantly stored in the decentralized data protection system. This process may be repeated until the number of copies stored in data nodes reachable by the data node meets the requirements of the data protection policies. The unacceptable state(s) may be remediated via other methods without departing from the invention.

The method may proceed to step 308 following step 314.

Using the method illustrated in FIG. 3.1, a system in accordance with embodiments of the invention may provide data archiving services for data even when nodes storing copies of the data become unreachable.

FIG. 3.2 shows a flowchart of a method in accordance with one or more embodiments of the invention. The method depicted in FIG. 3.2 may be used to respond to a data state verification request in accordance with one or more embodiments of the invention. The method shown in FIG. 3.2 may be performed by, for example, data nodes (e.g., 100, FIG. 1.1). Other components of the system illustrated in FIG. 1.1 may perform the method of FIG. 3.2 without departing from the invention.

In step 320, a request to verify the state of a copy of data is obtained. The copy of the data may be stored in a replica repository.

In step 322, is determined whether the copy of the data is stored in replica repository. If the copy of the data is stored in replica repository, the method may proceed to step 324. If the copy of the data is not stored in replica repository, the method may proceed to step 330.

In step 324, the state of the copy of the data in the replica repository is determined. That is, it is determined whether the copy of the data should be in replica repository. If the copy of the data is stored in the replica repository, the state is determined as acceptable. If the copy of the data is not stored in the replica repository, the state is determined as unacceptable.

In step 326, it is determined whether the state of the copy of the data is acceptable. If the state is acceptable, the method may proceed to step 328. If the state is not acceptable, the method may proceed to step 334.

In step 328, the notification is sent that indicates that the state of the copy of the data is acceptable.

The method may end following step 328.

Returning to step 326, the method may proceed to step 334 if the state is unacceptable.

In step 334, a notification is sent that states that the copy of the data is unacceptable.

The method may end following step 334.

Returning to step 322, the method may proceed to step 334 if the copy of the data is not stored in the replica repository. That is, if the copy of the data is not expected to be stored in the replica repository because the copy of the data was previously archived.

In step 330, and archive state of the copy of the data in the archive node is determined. Archive state of the copy of the data and archive node to be determined by sending a request for the archive state to archive node. If an archive for the copy of the data is present in the archive node, archive node may indicate that the archive state is acceptable. If an archive for the copy of the data is not present in the archive node, archive node may indicate that the archive state is unacceptable.

In step 332 it is determined whether the archive state is acceptable.

If the archive state is acceptable, the method may proceed to step 328. If the archive state is not acceptable, the method may proceed to step 334.

Using the method illustrated in FIG. 3.2, a system in accordance with embodiments of the invention may determine whether copies of data stored in the system is in an acceptable state. Such determinations may be used priori to initiate archiving of data to ensure that a proper number of archives of data are generated.

FIG. 3.3 shows a flowchart of a method in accordance with one or more embodiments of the invention. The method depicted in FIG. 3.3 may be used to archive data in accordance with one or more embodiments of the invention. The method shown in FIG. 3.3 may be performed by, for example, data nodes (e.g., 100, FIG. 1.1). Other components of the system illustrated in FIG. 1.1 may perform the method of FIG. 3.3 without departing from the invention.

In step 340, request to archive a copy of data stored in replica repositories obtained.

In one or more embodiments of the invention, the request to archive the copy of the data is obtained from a data node that generated the data.

In step 342, an archive of the copy of the data is generated and the archive is sent to an archive node.

In one or more embodiments of the invention, generating the archive of the copy of the data reduces the size of the copy of the data. For example, archive of the copy of the data may compress or de-duplicate the copy of the data against data stored in the archive node.

In step 344, a replica metadata entry associated with the copy of the data is generated. As noted above, a replica metadata entry may include information that identifies storage location of the archive as well as the copy of the data which was used to generate the archive.

In step 346, the copy of the data is deleted from the replica repository.

In step 348, after deleting the copy of the data, is advertised that the copy of the data is stored in the replica repository.

In one or more embodiments of the invention, advertising that the copy of the data is stored in the replica repository is performed by maintaining an entry of a distributed data storage map associated with the copy of the data. That is, the advertising may cause other data nodes to act as though the copy of the data is still stored in the data node.

The method may end following step 348.

Using the method illustrated in FIG. 3.3, a system in accordance with embodiments of the invention may archive copies of data in a manner compatible with a decentralized data protection system.

FIG. 3.4 shows a flowchart of a method in accordance with one or more embodiments of the invention. The method depicted in FIG. 3.4 may be used to respond to requests for copies of data in accordance with one or more embodiments of the invention. The method shown in FIG. 3.4 may be performed by, for example, data nodes (e.g., 100, FIG. 1.1). Other components of the system illustrated in FIG. 1.1 may perform the method of FIG. 3.4 without departing from the invention.

In step 360, a request for a copy of data is obtained for requesting entity.

In one or more embodiments of the invention, the copy of the data was previously stored in the data node.

In step 362, it is determined whether the copy of the data is stored in a replica repository of the data node. If the copy of the data stored in the replica repository, the method may proceed to step 364. If the copy of the data is not stored in the replica repository, the method may proceed to step 366.

In step 364, the copy of the data from the replica repository is provided in response to the request.

The method may end following step 364.

Returning to step 362, the method may proceed to step 366 following step 362.

In step 366, retrieval of the copy of the data is orchestrated for the requesting entity.

In one or more embodiments of the invention, retrieval of the copy of the data is orchestrated by obtaining an archive of the copy of the data from an archive node. Either the archive may be provided, or the copy of the data may be generated using the archive and the copy of the data may be provided in response to the request.

In one or more embodiments of the invention, retrieval of the copy of the data is orchestrated by sending replica metadata associated with the copy of the data in response to the request. The replica metadata may include information that enables an archive of the copy of the data to be retrieved from an archive node.

The method may end following step 366.

Using the method illustrated in FIG. 3.4, a system in accordance with embodiments of the invention may enable a node to provide a copy of data that may or may not have been previously archived in a manner that is compatible with a decentralized data protection system.

To further clarify embodiments of the invention, a non-limiting example is provided in FIGS. 4.1-4.7. FIGS. 4.1-4.7 illustrates a system similar to that of FIG. 1.1. For the sake of brevity, only a limited number of components of the system of FIG. 1.1 are illustrated in FIGS. 4.1-4.7.

Example

Consider a scenario as illustrated in FIG. 4.1 in which a decentralized data protection system includes three data nodes (e.g., 400, 410, 420) and three archive nodes (e.g., 430, 440, 450). At a first point in time, data node A (400) stores data (400.2). To provide data redundancy, copies of the data (410.2, 420.2) are stored in data node B (410) and data node C (420).

At a second point in time, the age of the data (400.2) reaches a threshold set by a data protection policy that triggers a data archive event. In response to the data archive event, data node A (400) issues and archive request (402) to data nodes B and C as shown in FIG. 4.2.

After sending the archive request, data node A (400) stores an archive of the data (430.2) in archive node A (430). Similarly, data node B (410) stores and archive of the copy of the data (440.2) and archive node B (440) and data node C (420) stores and archive of the copy of the data (450.2) in archive node C (450) as illustrated in FIG. 4.3.

After the archives or stored in the archive nodes, data node A (400) generates archive metadata (400.4), data node B (410) generates replica metadata (410.4), and data node C (420) also generates replica metadata (410.4).

At a point in time, archive node A (430) becomes unreachable due to a change in network topology as illustrated in FIG. 4.4. After archive node A (430) becomes unreachable, data node A (400) has a need for the data. Because data node B (410) has continued to advertise that it maintains a copy of the data, data node A (400) sends a request for the copy of the data (404) to data node B (410) as shown in FIG. 4.5.

Because data node B (410) does not actually maintain a copy of the data due to the previous archiving of the copy of the data, data node B (410) sends an archive node B identifier (410.2) to data node A (400) in response to request from data node A (400). In response to receiving the archive node B identifier (410.2), data node A (400) obtains an archive of the copy of the data (440.2) from archive node B (440) as shown in FIG. 4.6.

Using the archive of the copy of the data (440.2), data node A (400) generates a copy of the data based on the archive (400.6) as illustrated in FIG. 4.7. Thus, even though data node B (410) did not actually store a copy of the data, data node A (400) was still able to retrieve a copy of the data due to the replica metadata generated by data node B (410) when archiving its copy of the data.

End of Example

Any of the components of FIG. 1.1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may improve the field of decentralized storage. Specifically, embodiments of the invention may improve decentralized stored systems by improving the tolerance of such systems to changes in network connectivity. Embodiments of the invention improve tolerance to changes in network activity performing specific methods for storing, retrieving, and archiving data in such a system.

Thus, embodiments of the invention may address problems that arises due to the technological nature of decentralized data protection systems. For example, decentralized data protection systems that rely on redundant storage of data for data integrity purposes are susceptible to system failure due to loss of network connectivity between nodes of the decentralized system. Embodiments of the invention may improve decentralized data protection systems by improving their tolerance to changes in or loss of network connectivity between nodes of the system.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions, e.g., computer readable program code, executed by one or more processors of the data management device. Further, such instructions may correspond to computer readable instructions, e.g., computer readable program code, that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A node for use in a data archive, comprising:
  a persistent storage that stores a copy of data; and
  a data protection agent programmed to:
    obtain a request to archive the copy of the data;
    in response to the request:
      generate an archive of the copy of the data;
      store the archive in an archive node;
      generate metadata based on the archive;
      delete the copy of the data from the persistent storage; and
      after deleting the copy of the data, advertise, to a plurality of second nodes, that the copy of the data is stored in the node.

2. The node of claim 1, wherein the metadata comprises:
  an association of the metadata with the copy of the data;
  an identifier of the copy of the data; and
  retrieval information for the archive.

3. The node of claim 1 wherein the copy of the data is advertised by maintaining an entry in a distributed data storage map of the archive associated with the copy of the data.

4. The node of claim 1, wherein the data protection agent is further programmed to:
  obtain a second request for the copy of the data from one of the plurality of second nodes;

in response to the second request:
    make a determination that the copy of the data is not stored in the persistent storage; and
    in response to the determination:
        orchestrate retrieval of the copy of the data for the one of the plurality of second nodes.

5. The node of claim 4, wherein orchestrating retrieval of the copy of the data for the one of the plurality of second nodes comprises:
    sending retrieval information for the archive to the one of the plurality of second nodes.

6. The node of claim 4, wherein orchestrating retrieval of the copy of the data for the one of the plurality of second nodes comprises:
    obtaining a copy of the archive;
    generating a second copy of the data using the copy of the archive; and
    providing the second copy of the data to the one of the plurality of second nodes.

7. The node of claim 4, wherein orchestrating retrieval of the copy of the data for the one of the plurality of second nodes comprises:
    obtaining a copy of the archive; and
    providing the copy of the archive to the one of the plurality of second nodes.

8. A method for managing a node in a data archive, comprising:
    obtaining a request to archive a copy of data stored in the node;
    in response to the request:
        generating an archive of the copy of the data;
        storing the archive in an archive node;
        generating metadata based on the archive;
        deleting the copy of the data from persistent storage of the node; and
        after deleting the copy of the data, advertising, to a plurality of second nodes, that the copy of the data is stored in the node.

9. The method of claim 8, wherein the metadata comprises:
    an association of the metadata with the copy of the data;
    an identifier of the copy of the data; and
    retrieval information for the archive.

10. The method of claim 8, wherein the copy of the data is advertised by maintaining an entry in a distributed data storage map of the archive associated with the copy of the data.

11. The method of claim 8, wherein the method further comprises:
    obtaining a second request for the copy of the data from the one of the plurality of second nodes;
    in response to the second request:
        making a determination that the copy of the data is not stored in the persistent storage; and
        in response to the determination:
            orchestrating retrieval of the copy of the data for the one of the plurality of second nodes.

12. The method of claim 11, wherein orchestrating retrieval of the copy of the data for the one of the plurality of second nodes comprises:
    sending retrieval information for the archive to the one of the plurality of second nodes.

13. The method of claim 12, wherein orchestrating retrieval of the copy of the data for the one of the plurality of second nodes comprises:
    obtaining a copy of the archive;
    generating a second copy of the data using the copy of the archive; and
    providing the second copy of the data to the one of the plurality of second nodes.

14. The method of claim 12, wherein orchestrating retrieval of the copy of the data for the one of the plurality of second nodes comprises:
    obtaining a copy of the archive; and
    providing the copy of the archive to the one of the plurality of second nodes.

15. A non-transitory computer readable medium comprising computer readable program code, which when executed by a computer processor enables the computer processor to perform a method for managing a node in a data archive, the method comprising:
    obtaining a request to archive a copy of data stored in the node;
    in response to the request:
        generating an archive of the copy of the data;
        storing the archive in an archive node;
        generating metadata based on the archive;
        deleting the copy of the data from persistent storage of the node; and
        after deleting the copy of the data, advertising, to a plurality of second nodes, that the copy of the data is stored in the node.

16. The non-transitory computer readable medium of claim 15, wherein the metadata comprises:
    an association of the metadata with the copy of the data;
    an identifier of the copy of the data; and
    retrieval information for the archive.

17. The non-transitory computer readable medium of claim 15, wherein the copy of the data is advertised by maintaining an entry in a distributed data storage map of the archive associated with the copy of the data.

18. The non-transitory computer readable medium of claim 15, wherein the method further comprises:
    obtaining a second request for the copy of the data from the one of the plurality of second nodes; and
    in response to the second request:
        making a determination that the copy of the data is not stored in the persistent storage;
        in response to the determination:
            orchestrating retrieval of the copy of the data for the one of the plurality of second nodes.

19. The non-transitory computer readable medium of claim 18, wherein orchestrating retrieval of the copy of the data for the one of the plurality of second nodes comprises:
    sending retrieval information for the archive to the one of the plurality of second nodes.

20. The non-transitory computer readable medium of claim 19, wherein orchestrating retrieval of the copy of the data for the one of the plurality of second nodes comprises:
    obtaining a copy of the archive;
    generating a second copy of the data using the copy of the archive; and
    providing the second copy of the data to the one of the plurality of second nodes.

* * * * *